United States Patent
Wang et al.

(10) Patent No.: US 10,812,736 B2
(45) Date of Patent: Oct. 20, 2020

(54) DETECTED OBJECT BASED IMAGE AND VIDEO EFFECTS SELECTION

(71) Applicant: Polarr, Inc., Palo Alto, CA (US)

(72) Inventors: Borui Wang, San Jose, CA (US); Zhen Hua Yan, San Jose, CA (US)

(73) Assignee: Polarr, Inc., Palo Alto, CA (US)

( * ) Notice: Subject to any disclaimer, the term of this patent is extended or adjusted under 35 U.S.C. 154(b) by 0 days.

(21) Appl. No.: 16/231,875

(22) Filed: Dec. 24, 2018

(65) Prior Publication Data
US 2020/0204727 A1 Jun. 25, 2020

(51) Int. Cl.
| | |
|---|---|
| H04N 5/262 | (2006.01) |
| H04N 5/232 | (2006.01) |
| G06K 9/62 | (2006.01) |
| G06K 9/00 | (2006.01) |
| G06N 3/02 | (2006.01) |
| H04N 1/00 | (2006.01) |

(52) U.S. Cl.
CPC ....... *H04N 5/2621* (2013.01); *G06K 9/00664* (2013.01); *G06K 9/6201* (2013.01); *G06N 3/02* (2013.01); *H04N 1/00129* (2013.01); *H04N 5/23218* (2018.08); *H04N 5/23229* (2013.01); *H04N 2201/0084* (2013.01)

(58) Field of Classification Search
CPC .... H04N 5/2621; H04N 5/2628; H04N 5/265; H04N 5/272–278; G06T 19/006
See application file for complete search history.

(56) References Cited

U.S. PATENT DOCUMENTS

| | | | |
|---|---|---|---|
| 2011/0029914 A1 | 2/2011 | Whitby et al. | |
| 2014/0240552 A1* | 8/2014 | Kasahara | H04N 5/2256 348/239 |
| 2015/0109481 A1* | 4/2015 | Hayakawa | G06T 19/006 348/239 |
| 2017/0310884 A1 | 10/2017 | Li | |
| 2019/0095712 A1* | 3/2019 | Jung | G06F 16/50 |

FOREIGN PATENT DOCUMENTS

KR 101612054 B1 4/2016

OTHER PUBLICATIONS

PCT/US19/67784 ISR.
PCT/US19/67784 Written Opinion.

* cited by examiner

*Primary Examiner* — Paul M Berardesca
(74) *Attorney, Agent, or Firm* — Rowan TELS LLC

(57) ABSTRACT

A method of applying an image effect based on recognized objects involves capturing an imaging area comprising at least one object as an image stream through operation of an image sensor. The method recognizes the at least one object in the image stream through operation of an object detection engine. The method communicates at least one correlated image effect control to an image processing engine, in response to the at least one object comprising an optical label. The method communicates at least one matched image effect control to the image processing engine, in response to receiving at least a labeled image stream at an image effect matching algorithm from the object detection engine. The method generates a transformed image stream displayable through a display device by applying at least one image effect control to the image stream through operation of the image processing engine.

20 Claims, 14 Drawing Sheets

DETECTED OBJECT BASED IMAGE AND VIDEO EFFECTS SELECTION

BACKGROUND

The aesthetic appeal of a digital photo or video may be enhanced with a variety of different imaging effects. These imaging effects may include adjustments/corrections for color, contrast, brightness, and etc., stylistic filters such as grayscale filters, sepia filters, blur filters, etc., as well as enhancement effects such as object linked augmentation effects where an digital object or mask is added to the digital photo or video for an identified object, and distortion effects that alter the appearance of the identified objects within the digital photo or video. These imaging effects may be applied and viewed in real time by users before capturing a digital photo or recording the digital video.

While these imaging effects may be utilized by any user attempting to capture or record a digital photo or video, selecting the appropriate and/or most aesthetically appealing imaging effect for a particular scene can be difficult for a novice. In many cases, the appropriate and/or most aesthetically appealing imaging effect may be highly subjective and dependent on a variety of elements such as the subjects and the composition. Therefore, a need exists for automatically selecting imaging effects applied to digital photos or videos.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
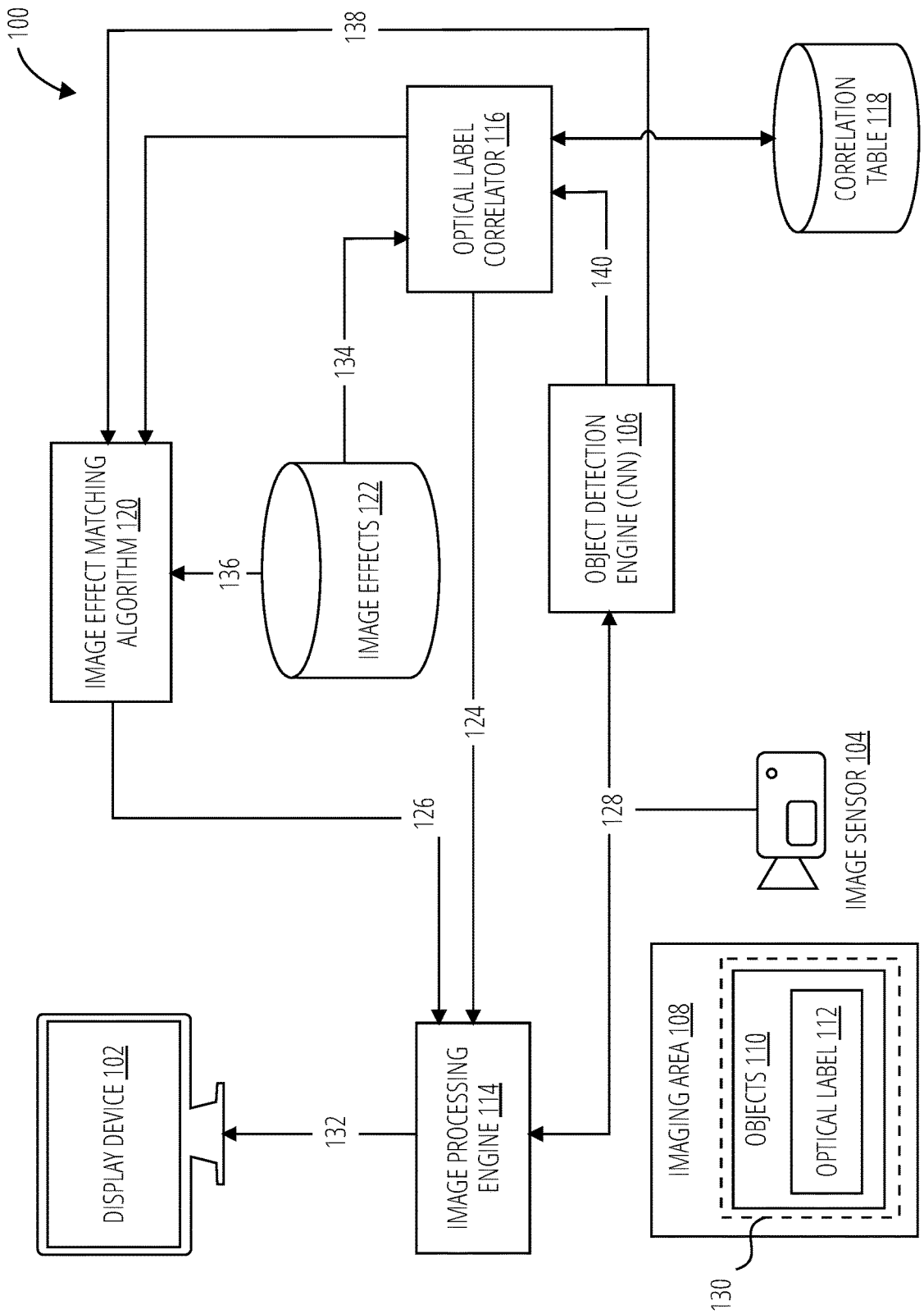
FIG. 1 illustrates a system 100 in accordance with one embodiment.

"Virtual reality" refers to the computer-generated simulation of a three-dimensional environment that can be interacted with in a seemingly real or physical way by a person using special electronic equipment, such as a headset with a display and gloves fitted with sensors.

"Augmented reality" refers to technology that superimposes computer-generated imagery on a user's view of the real world, thus providing a composite view.

"Virtualize" refers to converting a physical thing to a computer-generated simulation of that thing.

"Engine" refers to logic that inputs signals that affect internal processes of the logic to generate deterministic outputs, typically in a manner optimized for efficiency and speed (vs. size or machine resource utilization).

"Correlator" refers to a logic element that identifies a configured association between its inputs. One examples of a correlator is a lookup table (LUT) configured in software or firmware. Correlators may be implemented as relational databases. An example LUT correlator is: llow_alarm_condition llow_threshold_value| 0||safe_condition|safe_lower_bound|safe_upper_bound||high_alarm_condition|high_threshold_value|0| Generally, a correlator receives two or more inputs and produces an output indicative of a mutual relationship or connection between the inputs. Examples of correlators that do not use LUTs include any of a broad class of statistical correlators that identify dependence between input variables, often the extent to which two input variables have a linear relationship with each other. One commonly used statistical correlator is one that computes Pearson's product-moment coefficient for two input variables (e.g., two digital or analog input signals). Other well-known correlators compute a distance correlation, Spearman's rank correlation, a randomized dependence correlation, and Kendall's rank correlation. Many other examples of correlators will be evident to those of skill in the art, without undo experimentation.

"QR code" refers to a matrix barcode (two-dimensional bar code) comprising (typically) black modules (e.g., square dots) arranged in a square grid on a (typically) white background. The information encoded may be made up of four standardized types ("modes") of data (numeric, alphanumeric, byte/binary, Kanji) or, through supported extensions, virtually any type of data.

A system and method for selecting imaging effects based on detected objects manipulates an image or video based on detected information inside the image or video. The first part is a database on a server or offline device that can store a list of visual effects including adjustments in color, shape, and lighting for a particular subject or an entire image. Each effect may be selected based on the identification of an optical label, such as a quick response (QR) code, or a barcode visible by the imaging device. The system and method may also provide an algorithm to match an imaging effect to recognized object classifications (i.e., person, place, things, etc.), spatial arrangement of objects, presence of optical labels, and combinations thereof by the camera or the photo application of a device with an image sensor, and then provide the content of the effects such as color, shape, or lighting adjustment to the camera or a photo application.

A method of applying an image effect based on recognized objects involves capturing an imaging area comprising at least one object as an image stream through operation of an image sensor. The method recognizes the at least one object in the image stream through operation of an object detection engine. The method communicates at least one correlated image effect control to an image processing engine, in response to the at least one object comprising an optical label. The method communicates at least one matched image effect control to the image processing engine, in response to receiving at least a labeled image stream at an image effect matching algorithm from the object detection engine. The method generates a transformed image stream displayable through a display device by applying at least one image effect control to the image stream through operation of the image processing engine.

The object detection engine may be a trained artificial neural network for recognizing the at least one object in the image stream.

The method of applying an image effect based on recognized objects may involve receiving the image stream from the image sensor at the object detection engine. The method may detect the optical label in the image stream and extract an embedded identifier from the optical label through operation of the object detection engine. The method may identify the at least one image effect control in an image effects repository through comparison of the embedded identifier to optical label identifiers in a correlation table through operation of an optical label correlator.

The method of applying an image effect based on recognized objects may involve receiving the image stream from the image sensor at the object detection engine. The method may detect at least one recognized object in the image stream through operation of the object detection engine. The method may generate the labeled image stream by identifying each recognized object within the image stream with an object classification label and by identifying an object environment and object arrangement within the image stream as a scene with a scene classification label. The method may operate the image effect matching algorithm to match the optical label, the scene classification label, object classification label, or combinations thereof with at least one corresponding image effect control from an image effects repository.

In some configurations, the image effect matching algorithm may utilize a trained artificial neural network to match the optical label, the scene classification label, object classification label, or combinations thereof with the at least one corresponding image effect control from the image effects repository.

In some configurations, the at least one image effect control may be a filter effect control, an object linked augmentation effect control, a distortion effect control, an overlay control, and combinations thereof.

A non-transitory computer-readable storage medium, the computer-readable storage medium including instructions that when executed by a computer, may cause the computer to capture an imaging area comprising at least one object as an image stream through operation of an image sensor. The computer may then recognize the at least one object in the image stream through operation of an object detection engine. The computer may then communicate at least one correlated image effect control to an image processing engine in response to the at least one object comprising an optical label. The computer may then communicate at least one matched image effect control to the image processing engine in response to receiving at least a labeled image stream at an image effect matching algorithm from the object detection engine. The computer may then generate a transformed image stream displayable through a display device by applying at least one image effect control to the image stream through operation of the image processing engine.

In some configurations, the object detection engine may be a trained artificial neural network for recognizing the at least one object in the image stream.

The instructions may further configure the computer to receive the image stream from the image sensor at the object detection engine. The computer may then detect the optical label in the image stream and extract an embedded identifier from the optical label through operation of the object detection engine. The computer may then identify the at least one image effect control in an image effects repository through comparison of the embedded identifier to optical label identifiers in a correlation table through operation of an optical label correlator.

The instructions may further configure the computer to receive the image stream from the image sensor at the object detection engine. The computer may then detect at least one recognized object in the image stream through operation of the object detection engine. The computer may then generate the labeled image stream by identifying each recognized object within the image stream with an object classification label and by identifying an object environment and object arrangement within the image stream as a scene with a scene classification label. The computer may then operate the image effect matching algorithm to match the optical label, the scene classification label, object classification label, or combinations thereof with at least one corresponding image effect control from an image effects repository.

In some configurations, the image effect matching algorithm may utilize a trained artificial neural network to match the optical label, the scene classification label, object classification label, or combinations thereof with the at least one corresponding image effect control from the image effects repository.

In some configurations, the at least one image effect control may be a filter effect control, an object linked augmentation effect control, a distortion effect control, an overlay control, and combinations thereof.

A computing apparatus may comprise a processor and a memory storing instructions that, when executed by the processor, configure the computing apparatus to capture an imaging area comprising at least one object as an image stream through operation of an image sensor. The computing apparatus may then recognize the at least one object in the image stream through operation of an object detection engine. The computing apparatus may then communicate at least one correlated image effect control to an image processing engine in response to the at least one object comprising an optical label. The computing apparatus may then communicate at least one matched image effect control to the image processing engine in response to receiving at least a labeled image stream at an image effect matching algorithm from the object detection engine. The computing apparatus may then generate a transformed image stream displayable through a display device by applying at least one image effect control to the image stream through operation of the image processing engine.

In some configurations, the object detection engine may be a trained artificial neural network for recognizing the at least one object in the image stream.

The instructions may further configure the apparatus to receive the image stream from the image sensor at the object detection engine. The apparatus may then detect the optical label in the image stream and extract an embedded identifier from the optical label through operation of the object detection engine. The apparatus may then identify the at least one image effect control in an image effects repository through comparison of the embedded identifier to optical label identifiers in a correlation table through operation of an optical label correlator.

The instructions may further configure the apparatus to receive the image stream from the image sensor at the object detection engine. The apparatus may detect at least one recognized object in the image stream through operation of the object detection engine. The apparatus may generate the labeled image stream by identifying each recognized object within the image stream with an object classification label and by identifying an object environment and object arrangement within the image stream as a scene with a scene classification label. The apparatus may operate the image effect matching algorithm to match the optical label, the scene classification label, object classification label, or combinations thereof with at least one corresponding image effect control from an image effects repository.

In some configurations, the image effect matching algorithm may utilize a trained artificial neural network to match the optical label, the scene classification label, object classification label, or combinations thereof with the at least one corresponding image effect control from the image effects repository.

In some configurations, the at least one image effect control may be a filter effect control, an object linked augmentation effect control, a distortion effect control, an overlay control, and combinations thereof.

In some configurations, a trained artificial neural network utilized by the object detection engine and the image effect matching algorithm may be a type of convolutional neural network (CNN).

Convolutional neural networks (CNNs) are particularly well suited to classifying features in data sets modelled in two or three dimensions. This makes CNNs popular for image classification, because images can be represented in computer memories in three dimensions (two dimensions for width and height, and a third dimension for pixel features like color components and intensity). For example, a color JPEG image of size 480×480 pixels can be modelled in computer memory using an array that is 480×480×3, where each of the values of the third dimension is a red, green, or blue color component intensity for the pixel ranging from 0 to 255. Inputting this array of numbers to a trained CNN will generate outputs that describe the probability of the image being a certain class (0.80 for cat, 0.15 for dog, 0.05 for bird, etc.) Image classification is the task of taking an input image and outputting a class (a cat, dog, etc.) or a probability of classes that best describes the image.

Fundamentally, CNNs input the data set, pass it through a series of convolutional transformations, nonlinear activation functions (e.g., RELU), and pooling operations (down-sampling, e.g., maxpool), and an output layer (e.g., softmax) to generate the classifications.

FIG. 1 illustrates a system 100. The system 100 comprises an imaging area 108, an image sensor 104, a display device 102, an image effect matching algorithm 120, an image processing engine 114, an optical label correlator 116, an image effects repository 122, and an object detection engine 106. The imaging area 108 is captured by the image sensor 104 to generate an image stream 128. The image stream 128 is a continuous image signal of the imaging area 108 that is communicated to the image processing engine 114 and the object detection engine 106. The imaging area 108 comprises at least one object 110 within an object environment 130. The at least one object 110 may include an optical label 112. The object detection engine 106 runs an object detection algorithm utilizing a convolutional neural network (CNN) on the image stream 128 to identify the presence of the at least one object 110. Once the object detection engine 106 determines the presence of recognizable objects within the image stream 128, the object detection engine 106 may utilize an object classification algorithm that also utilizes a CNN to identify the at least one object 110 with an object classification label and the object environment 130, and the object arrangement within the image stream 128 as scene with a scene classification label. The labeled image stream 138 may then be communicated to the image effect matching algorithm 120.

In some instances, the object detection engine 106 may identify an optical label 112 within the image stream 128. The optical label 112 may include an embedded identifier that may be referenced within a correlation table 118 to a corresponding image effect control 134 within the image effects repository 122. The object detection engine 106 may communicate an embedded identifier 140 to the optical label correlator 116 to reference the correlation table 118 and identify a corresponding an image effect control 134 within the image effects repository 122. The optical label correlator 116 may communicate the correlated image effect control 124 to the image processing engine 114. The optical label correlator 116 may communicate information about the image effect control 134, the optical label 112, and/or the embedded identifier 140 to the image effect matching algorithm 120 for identifying additional image effect controls when viewed in combination with the labeled image stream 138.

The image effect matching algorithm 120 matches the optical label 112, the scene classification label, object classification label, or combinations thereof with at least one corresponding image effect control 136 from an image effects repository. Once a matched image effect control 126 is identified, the image effect matching algorithm 120 communicates the matched image effect control 126 to the image processing engine 114. The image processing engine 114 transforms the image stream 128 with the matched image effect control 126 and/or the correlated image effect control 124 to generate a transformed image stream 132 displayable through the display device 102.

Figure 4:
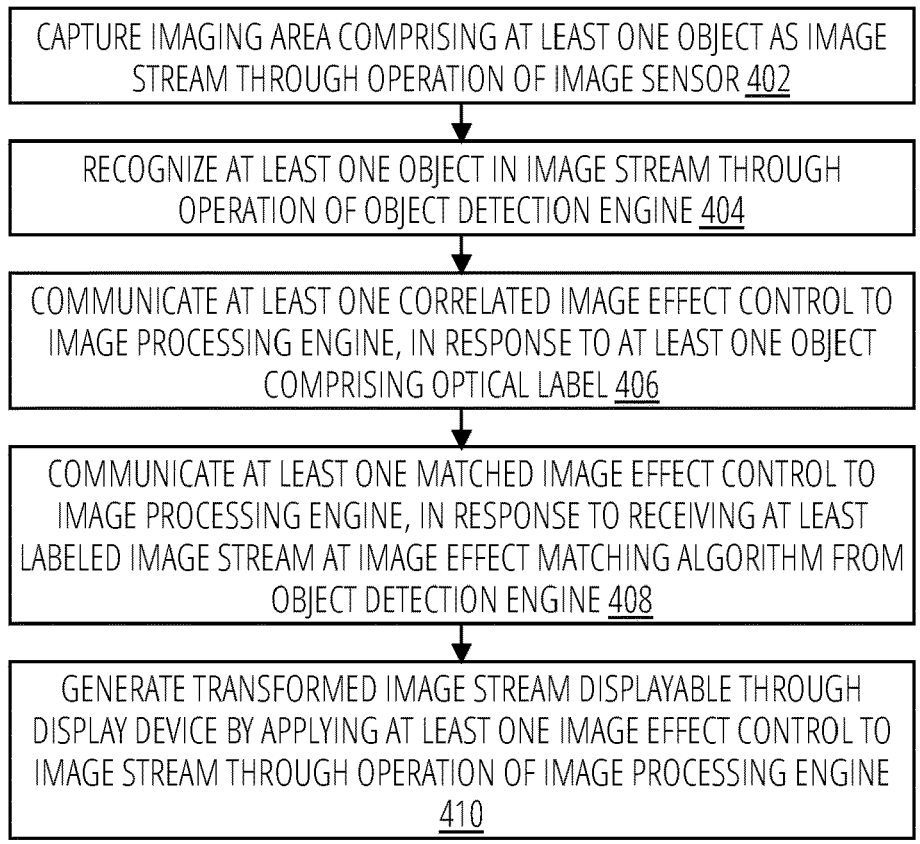
FIG. 4 illustrates a method 400 in accordance with one embodiment.
Figure 5:
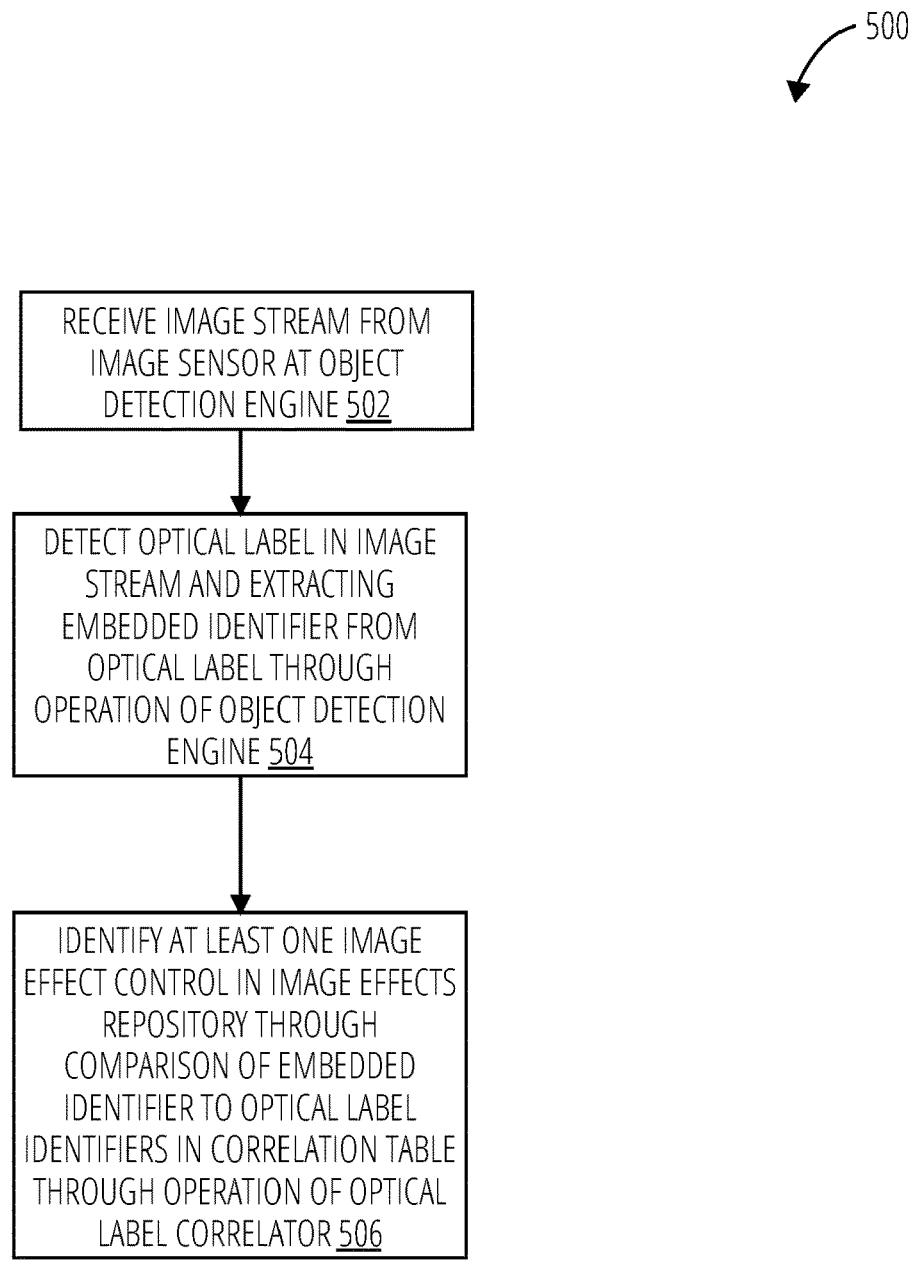
FIG. 5 illustrates a method 500 in accordance with one embodiment.
Figure 6:
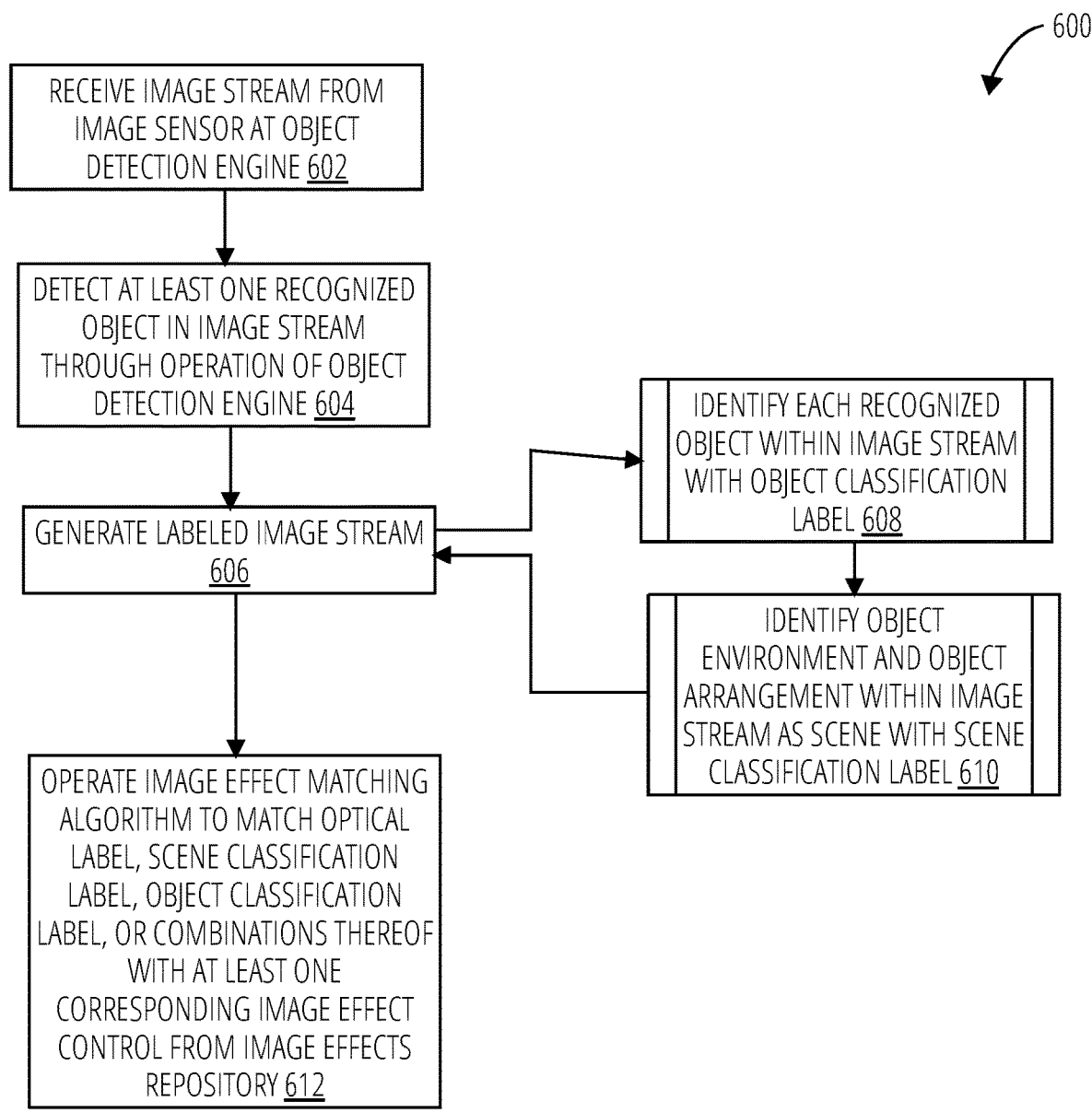
FIG. 6 illustrates a method 600 in accordance with one embodiment.

The system 100 may be operated in accordance with the process described in FIG. 4, FIG. 5, and FIG. 6.

Figure 2:
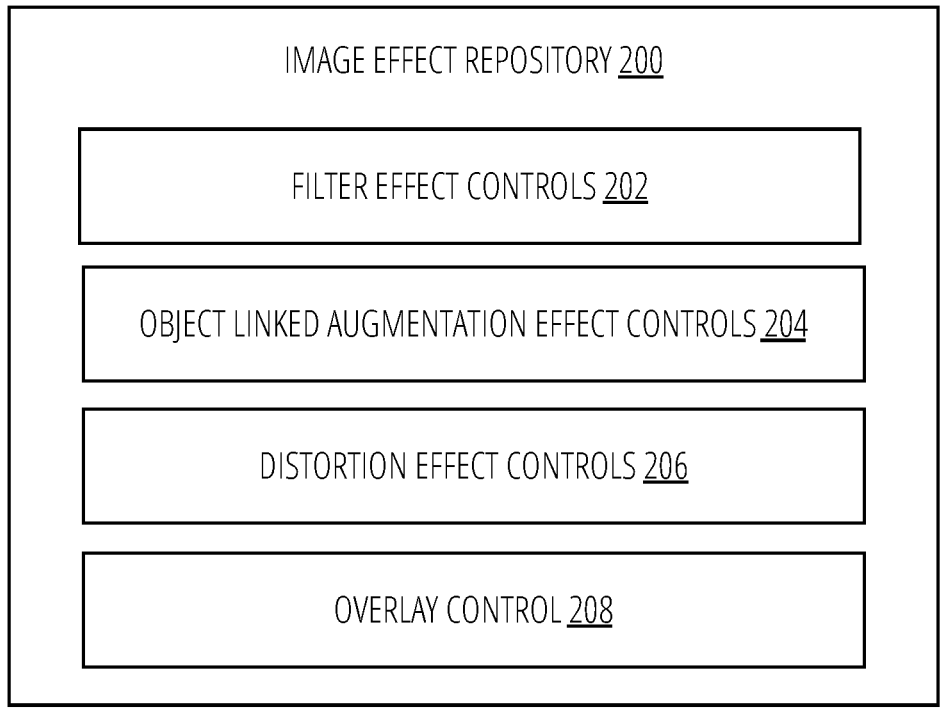
FIG. 2 illustrates an image effect repository 200 in accordance with one embodiment.

FIG. 2 illustrates an image effect repository 200 comprising a filter effect controls 202, an object linked augmentation effect controls 204, a distortion effect controls 206, and an overlay control 208.

The filter effect controls 202 are image post processing effects that modify channel values of the image stream. The filter effect controls 202 may be a set of parameters that modify pixel channels based on the specific values within the pixel channels and/or the distribution/relational positioning of the pixel channel with specific values. Examples of image filters include blur filters, brightness filters, contrast filters, grayscale filters, hue filters, color channel filters, saturation filters, sepia filters, spatial lowpass filters, spatial highpass filters, fourier representation filters, fourier lowpass, fourier highpass, etc.

The filter effect control may be configured as a CSS filter. An example of the CSS filter is provided below.

```
.blur {
  -webkit-filter: blur(4px);
  filter: blur(4px);
}
.brightness {
  -webkit-filter: brightness(0.30);
  filter: brightness(0.30);
}
.contrast {
  -webkit-filter: contrast(180%);
  filter: contrast(180%);
}
```

```
.grayscale {
    -webkit-filter: grayscale(100%);
    filter: grayscale(100%);
}
.huerotate {
    -webkit-filter: hue-rotate(180deg);
    filter: hue-rotate(180deg);
}
.invert {
    -webkit-filter: invert(100%);
    filter: invert(100%);
}
.opacity {
    -webkit-filter: opacity(50%);
    filter: opacity(50%);
}
.saturate {
    -webkit-filter: saturate(7);
    filter: saturate(7);
}
.sepia {
    -webkit-filter: sepia(100%);
    filter: sepia(100%);
}
.shadow {
    -webkit-filter: drop-shadow(8px 10px green);
    filter: drop-shadow(8px 10px green);
}
```

The object linked augmentation effect controls 204 may be digital manipulation of an area of the image stream corresponding to a detected object, a portion of the detected object, or an area overlapping or adjacent to the detected object. The digital manipulation may be the removal of a detected object or portion of the detected object with a mask or blend effect. For example, a person's face with blemishes or pimples may be detected, and the digital manipulation may remove the blemishes or pimples with a blend effect that removes the imperfection. In another example, a car that has not been washed may be detected, and the digital manipulation would be to modify the area corresponding to the car to appear as if it were clean. The digital manipulation may be the addition of a digital object such as glasses, hats, etc., to correspond with the movement of the detected object such as a user's face.

The distortion effect controls 206 are enhancements or modifications to an identified object in the image stream. For example, a distortion effect controls 206 may be provided to scale or warp the identified object.

The overlay controls 208 are digital manifestations (e.g., shapes, text, colors, etc.) displayed on a layer above the display of the image stream. For example, the overlay control 208 may be a logo displayed above the image stream.

Figure 3:
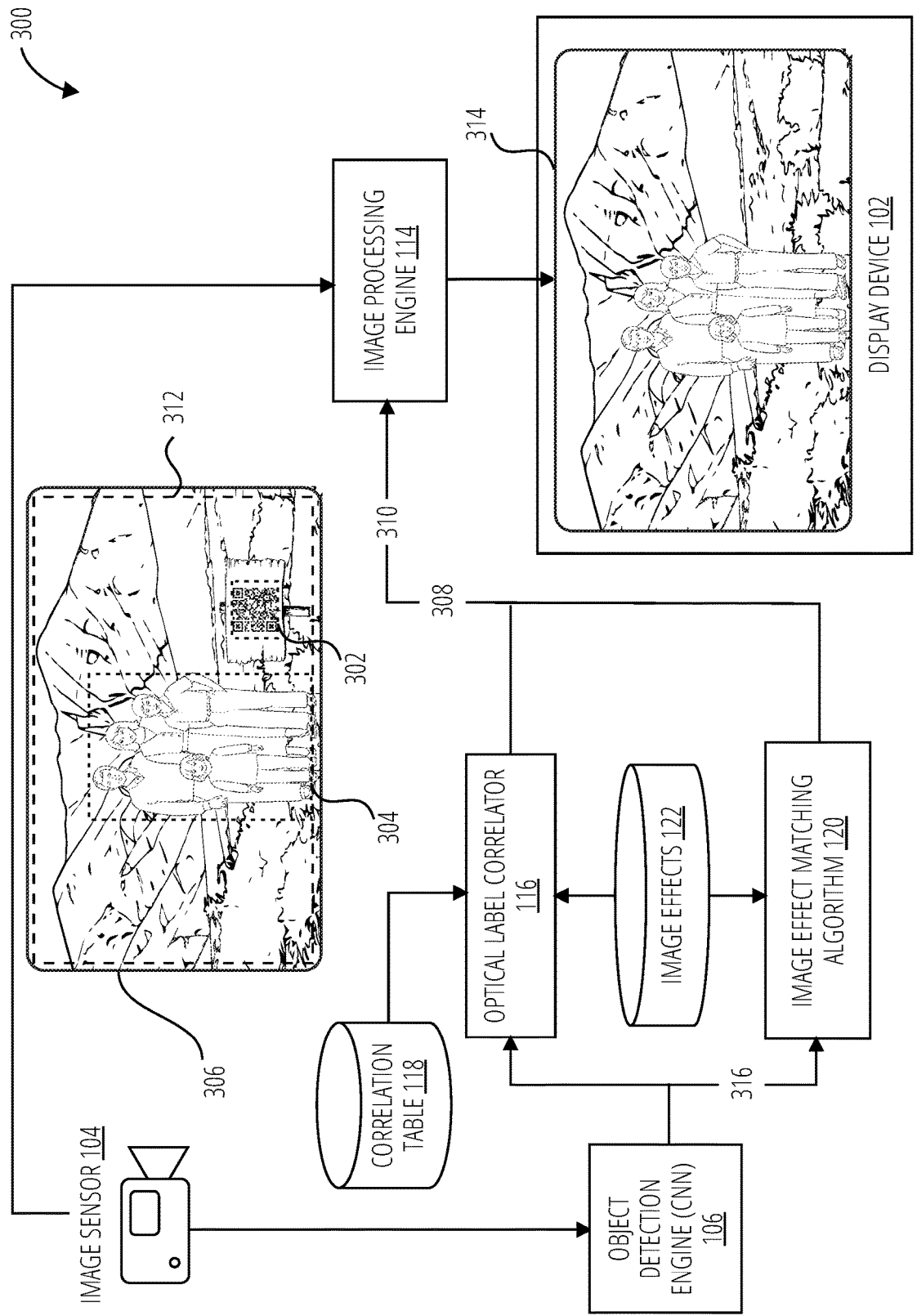
FIG. 3 illustrates a system 300 in accordance with one embodiment.

FIG. 3 illustrates a system 300 comprising an image sensor 104, an object detection engine 106, an optical label correlator 116, an image effects repository 122, an image effect matching algorithm 120, a correlation table 118, an image processing engine 114, and a display device 102. The image sensor 104 captures an imaging area 306 and communicates the image stream to the object detection engine 106. The object detection engine 106 detects objects within the image stream and identifies the objects as a family posing (object arrangement) as recognized objects 304 in front of a mountain (object environment 312) and assigns an object classification label for the family and a scene classification label for posing in front of the mountain, generating a labeled image stream 316.

The object detection engine 106 identifies that the family is standing next to a sign with a QR code (optical label 302).

The object detection engine 106 then identifies the embedded identifier from the optical label 302. The embedded identifier is communicated to the optical label correlator 116 which looks up the identifier in a correlation table 118 to locate a corresponding image effect control in the image effects repository 122.

The labeled image stream 316 is communicated to the image effect matching algorithm 120. The image effect matching algorithm 120 may utilize the information from the optical label correlator 116 for the optical label 302 with the information in the labeled image stream 316 to identify matching image effect controls that may be utilized in combination with the image effect controls identified by the optical label correlator 116. The image processing engine 114 receives an object linked augmentation effect control 310 and a filter effect control 308 to generate a transformed image stream 314 displayable through the display device 102. The object linked augmentation effect control 310 is utilized to remove the sign with the QR code from the image stream. This may be done by replacing the area of the signa with a composite image approximating the background. The filter effect control 308 is utilized to adjust the color balance of the object environment 312 making the mountains appear darker.

In FIG. 4, a method 400 captures an imaging area comprising at least one object as an image stream through operation of an image sensor (block 402). In block 404, the method 400 recognizes the at least one object in the image stream through operation of an object detection engine. In block 406, the method 400 communicates at least one correlated image effect control to an image processing engine, in response to the at least one object comprising an optical label. In block 408, the method 400 communicates at least one matched image effect control to the image processing engine, in response to receiving at least a labeled image stream at an image effect matching algorithm from the object detection engine. In block 410, the method 400 generates a transformed image stream displayable through a display device by applying at least one image effect control to the image stream through operation of the image processing engine.

In FIG. 5, a method 500 receives an image stream from the image sensor at an object detection engine (block 502). In block 504, the method 500 detects an optical label in the image stream and extracts an embedded identifier from the optical label through operation of the object detection engine. In block 506, the method 500 identifies the at least one image effect control in an image effects repository through comparison of the embedded identifier to optical label identifiers in a correlation table through operation of an optical label correlator.

In FIG. 6, a method 600 receives an image stream from an image sensor at an object detection engine (block 602). In block 604, the method 600 detects at least one recognized object in the image stream through operation of the object detection engine. In block 606, the method 600 generates a labeled image stream. In subroutine block 608, the method 600 identifies each recognized object within the image stream with an object classification label. In subroutine block 610, the method 600 identifies an object environment and object arrangement within the image stream as a scene with a scene classification label. In block 612, the method 600 operates the image effect matching algorithm to match the optical label, the scene classification label, object classification label, and combinations thereof with at least one corresponding image effect control from an image effects repository.

In some configurations the image effect matching algorithm may be operated in accordance with the following code listing:

```
function find_effect_through_object_and_qr_code_match(camera_feed){
// query format
    var prepared_query = {objects: [ ], scenes: [ ], qr_code: [ ]};
// detect objects and qr codes
    prepared_query = object_and_qr_detection(camera_feed);
//look up all effects matching objects, scenes or qr code
    results = database_execute("select","* from effects where objects
    include ? or scenes include ? qr_code = ? grouped by object",
    prepared_query.objects,prepared_query.scenes, prepared_query.qr_code);
// gather and sort effect by matching objects
    var object_based_effects = results.sort(function(a,b){a.objects.count -
    b.objects.count});
// gather and sort effect by matching scenes
    var scene_based_effects = results.sort(function(a,b){a.scenes.count -
    b.scenes.count});
// gather qr effect if there is a match
    var qr_based_effects = results.qr_code_effect;
    return {
    object_based_effects: object_based_effects,
    scene_based_effects: scene_based_effects,
    qr_based_effects: qr_based_effects
    }
}
```

In one example, a camera detects a scene with a green tree and a car under the tree and sunny weather. The matching algorithm looks up possible adjustment of green trees under sunny weather as well as cars under sunny weather. The algorithm may find a hue enhancement to compensate saturation lost by the tree, as well as a paint color enhancement for the cars. The algorithm returns these object specific manipulations back to the image processing engine which renders the effects to each object-in this case, the tree and the car.

In another example, the camera detects a QR code in the scene. The matching algorithm looks up the effect linked to the QR code object, and returns the effects to the image processing engine which renders the effect to the whole image. In this case, the QR code is placed in a restaurant that serves noodles, and the effects is around color, lighting and contrast enhancement for noodle related food.

In another example, the camera detects a person holding a red flower in a dark indoor scene. The matching algorithm looks up possible adjustment of the person in the dark indoor scene, as well as flowers in a dark indoor scene. The algorithm found adjustments for the person and flower, returns these adjustments to the image processing engine that renders the effects directly to each object—in this case person, and flower.

The system may provide configuration options and settings that allow blending the image control effects with the image stream based on a percentage from 0% percent to 100%. This may allow the user to determine how strong the effects look. At 0% all effects are turned off, at 50% the effects are blended equally with the original image, and at 100% the effects are at full rendition to the image.

In some configurations, the database of entries and objects for the object classifications and image control effects may be the same to all users, and the look up may be a simple object and entry look up.

The system may also combine the size, orientation of the object, the geolocation of the photo, time, and season the photo was taken together with the match. If there is no exact match, the system may determine the closest matching settings, for example, if there is no big green tree with effects, the system may drop the green or big object modifiers in the search until an image control effect is found.

The database may also be more specific or tailored to specific users. The database may be locally built and catered to how each user is editing photos manually, so entries created through the photo editing process are stored associated with that particular user. The look up phase may be for identifying the most popular edit for certain objects. For example, if a user edits a photo and 90% of the time, they increase the green hue of a tree by +2, then the result match should be an increase in the green hue of the tree +2.

Instead of the most popular, the system may provide user averages for specific settings in certain conditions. For example, 3 out of 5 times a user did +1 to a color channel value and 2 out of 5 times they did +2, the result match would be +7/5 for that particular adjustment.

Figure 7:
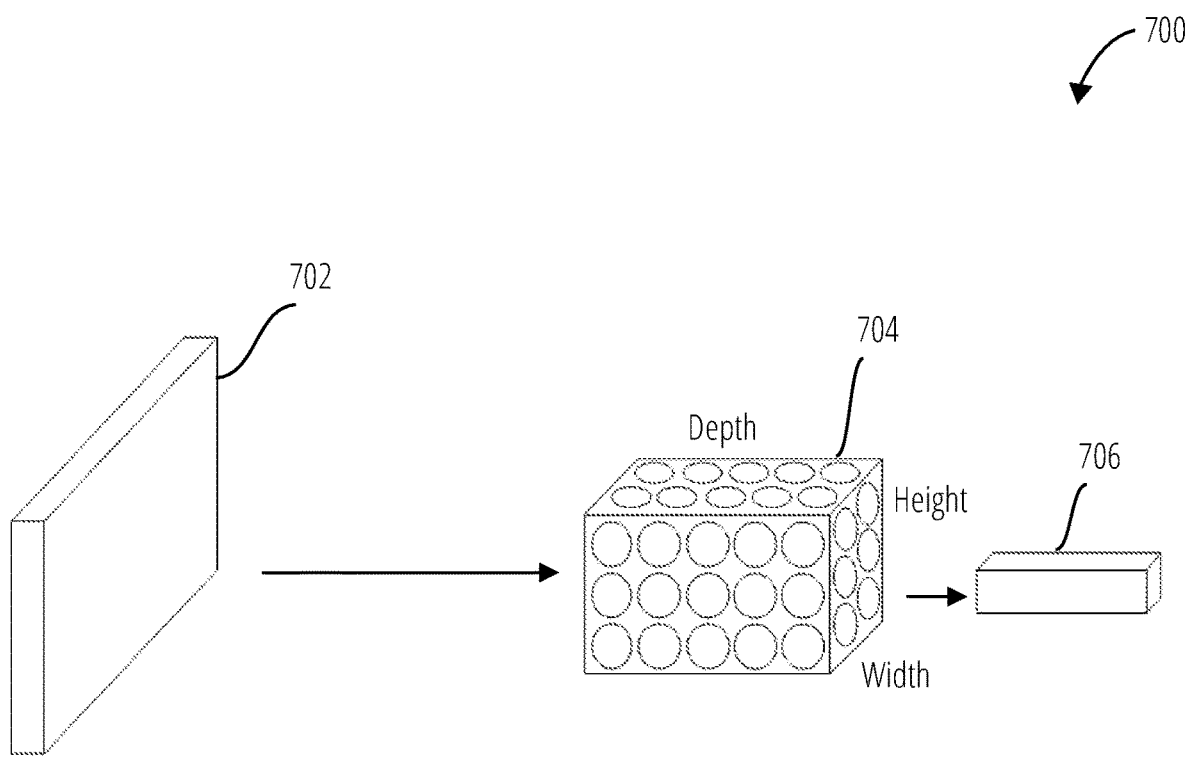
FIG. 7 illustrates a convolutional neural network 700 in accordance with one embodiment.

FIG. 7 illustrates an exemplary convolutional neural network 700 useful for the apparatuses and methods of the disclosure. The convolutional neural network 700 arranges its neurons in three dimensions (width, height, depth), as visualized in convolutional layer 704. Every layer of the convolutional neural network 700 transforms a 3D volume of inputs to a 3D output volume of neuron activations. In this example, the input layer 702 encodes the image, so its width and height would be the dimensions of the image, and the depth would be 3 (Red, Green, Blue channels). The convolutional layer 704 further transforms the outputs of the input layer 702, and the output layer 706 transforms the outputs of the convolutional layer 704 into one or more classifications of the image content.

Figure 8:
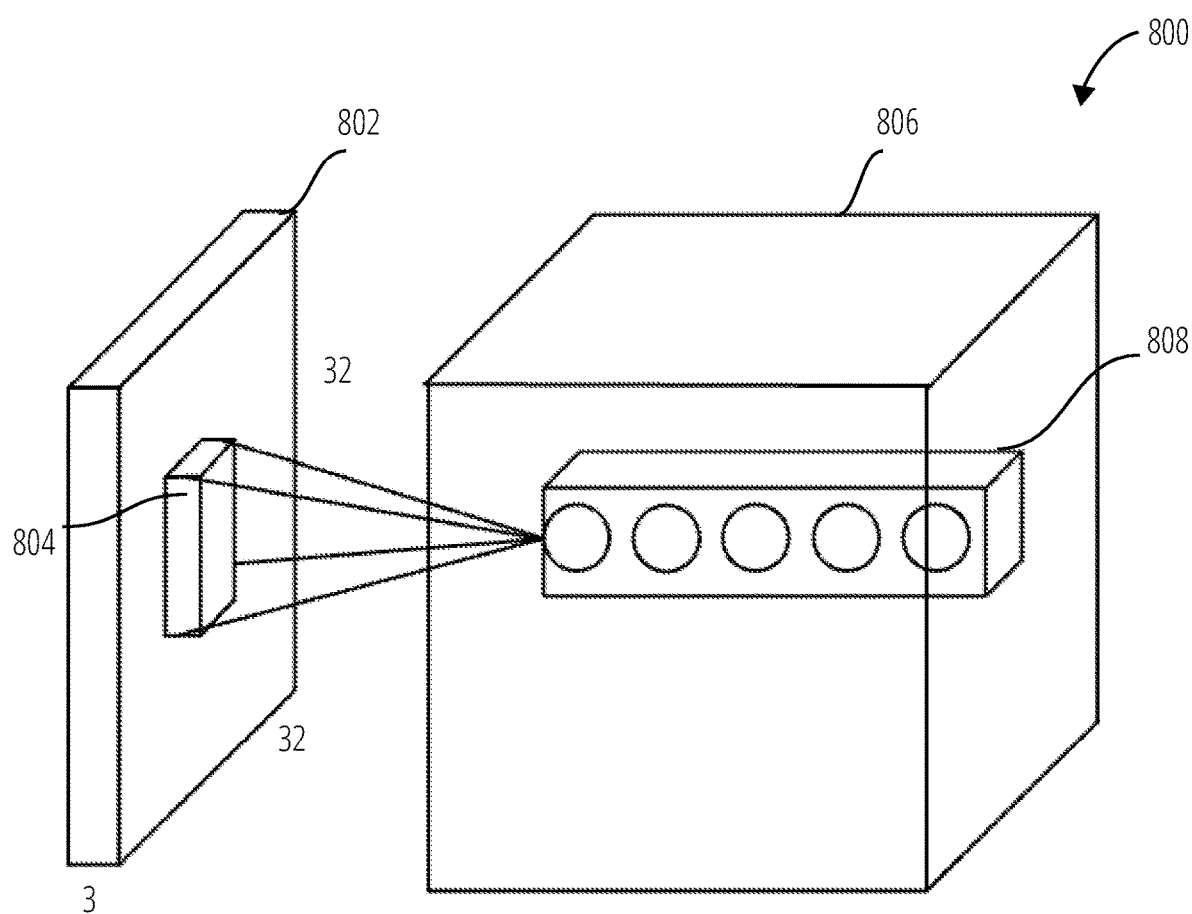
FIG. 8 illustrates a convolutional neural network layers 800 in accordance with one embodiment.

FIG. 8 illustrates an exemplary convolutional neural network layers 800 in more detail. An example subregion of the input layer region 804 of an input layer region 802 region of an image is analyzed by a set of convolutional layer subregion 808 in the convolutional layer 806. The input layer region 802 is 32×32 neurons long and wide (e.g., 32×32 pixels), and three neurons deep (e.g., three color channels per pixel). Each neuron in the convolutional layer 806 is connected only to a local region in the input layer region 802 spatially (in height and width), but to the full depth (i.e. all color channels if the input is an image). Note, there are multiple neurons (5 in this example) along the depth of the convolutional layer subregion 808 that analyzes the subregion of the input layer region 804 of the input layer region 802, in which each neuron of the convolutional layer subregion 808 may receive inputs from every neuron of the subregion of the input layer region 804.

Figure 9:
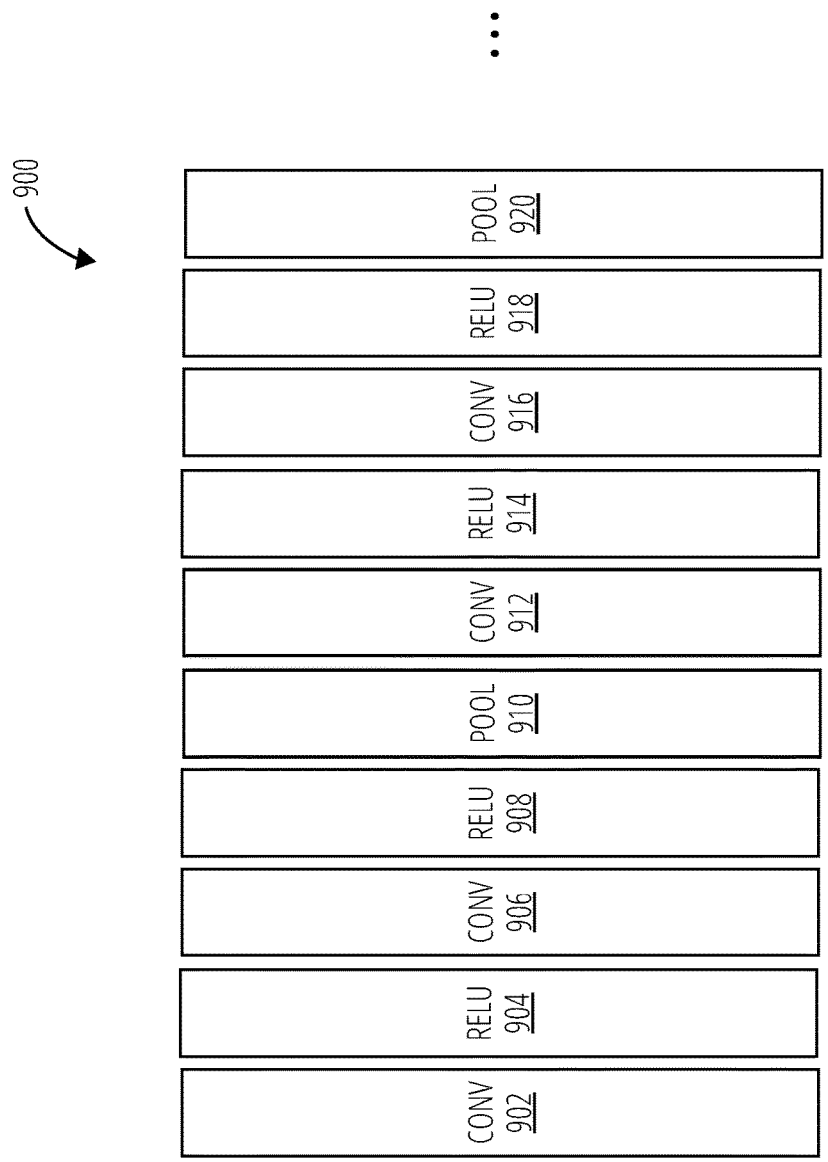
FIG. 9 illustrates a VGG net 900 in accordance with one embodiment.

FIG. 9 illustrates a popular form of a CNN known as a VGG net 900. The initial convolution layer 902 stores the raw image pixels and the final pooling layer 920 determines the class scores. Each of the intermediate convolution layers (convolution layer 906, convolution layer 912, and convolution layer 916) and rectifier activations (RELU layer 904, RELUlayer 908, RELUlayer 914, and RELUlayer 918) and intermediate pooling layers (pooling layer 910, pooling layer 920) along the processing path is shown as a column.

The VGG net 900 replaces the large single-layer filters of basic CNNs with multiple 3×3 sized filters in series. With a given receptive field (the effective area size of input image on which output depends), multiple stacked smaller size filters may perform better at image feature classification than a single layer with a larger filter size, because multiple non-linear layers increase the depth of the network which enables it to learn more complex features. In a VGG net 900 each pooling layer may be only 2×2.

Figure 10:
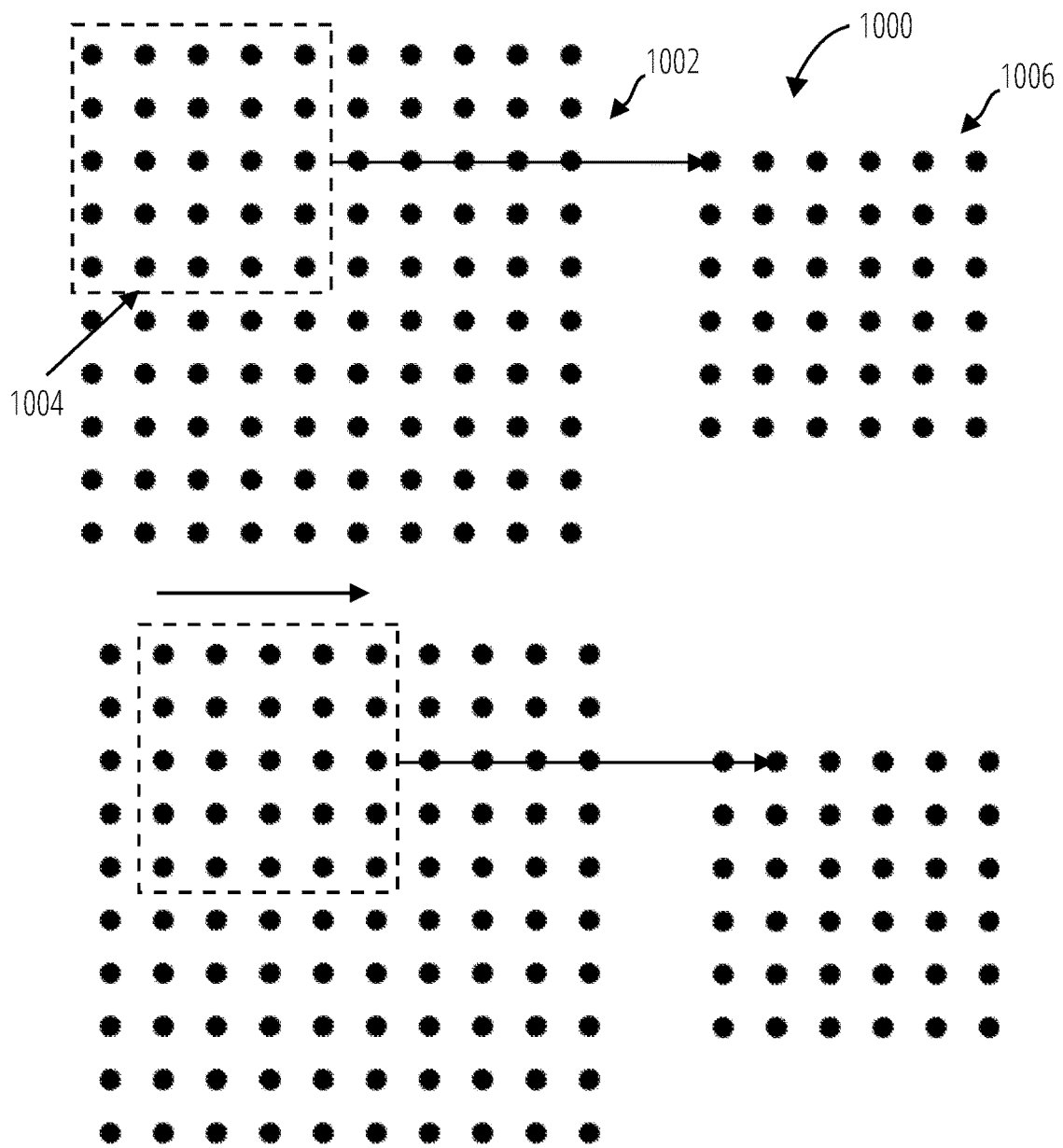
FIG. 10 illustrates a convolution layer filtering 1000 in accordance with one embodiment.

FIG. 10 illustrates a convolution layer filtering 1000 that connects the outputs from groups of neurons in a convolution layer 1002 to neurons in a next layer 1006. A receptive field is defined for the convolution layer 1002, in this example sets of 5×5 neurons. The collective outputs of each neuron the receptive field are weighted and mapped to a single neuron in the next layer 1006. This weighted mapping is referred to as the filter 1004 for the convolution layer 1002 (or sometimes referred to as the kernel of the convolution layer 1002). The filter 1004 depth is not illustrated in this example (i.e., the filter 1004 is actually a cubic volume of neurons in the convolution layer 1002, not a square as illustrated). Thus, what is shown is a "slice" of the full filter 1004. The filter 1004 is slid, or convolved, around the input image, each time mapping to a different neuron in the next layer 1006. For example FIG. 10 shows how the filter 1004 is stepped to the right by 1 unit (the "stride"), creating a slightly offset receptive field from the top one, and mapping its output to the next neuron in the next layer 1006. The stride can be and often is other numbers besides one, with larger strides reducing the overlaps in the receptive fields, and hence further reducing the size of the next layer 1006. Every unique receptive field in the convolution layer 1002 that can be defined in this stepwise manner maps to a different neuron in the next layer 1006. Thus, if the convolution layer 1002 is 32×32×3 neurons per slice, the next layer 1006 need only be 28×28×1 neurons to cover all the receptive fields of the convolution layer 1002. This is referred to as an activation map or feature map. There is thus a reduction in layer complexity from the filtering. There are 784 different ways that a 5×5 filter can uniquely fit on a 32×32 convolution layer 1002, so the next layer 1006 need only be 28×28. The depth of the convolution layer 1002 is also reduced from 3 to 1 in the next layer 1006.

The number of total layers to use in a CNN, the number of convolution layers, the filter sizes, and the values for strides at each layer are examples of "hyperparameters" of the CNN.

Figure 11:
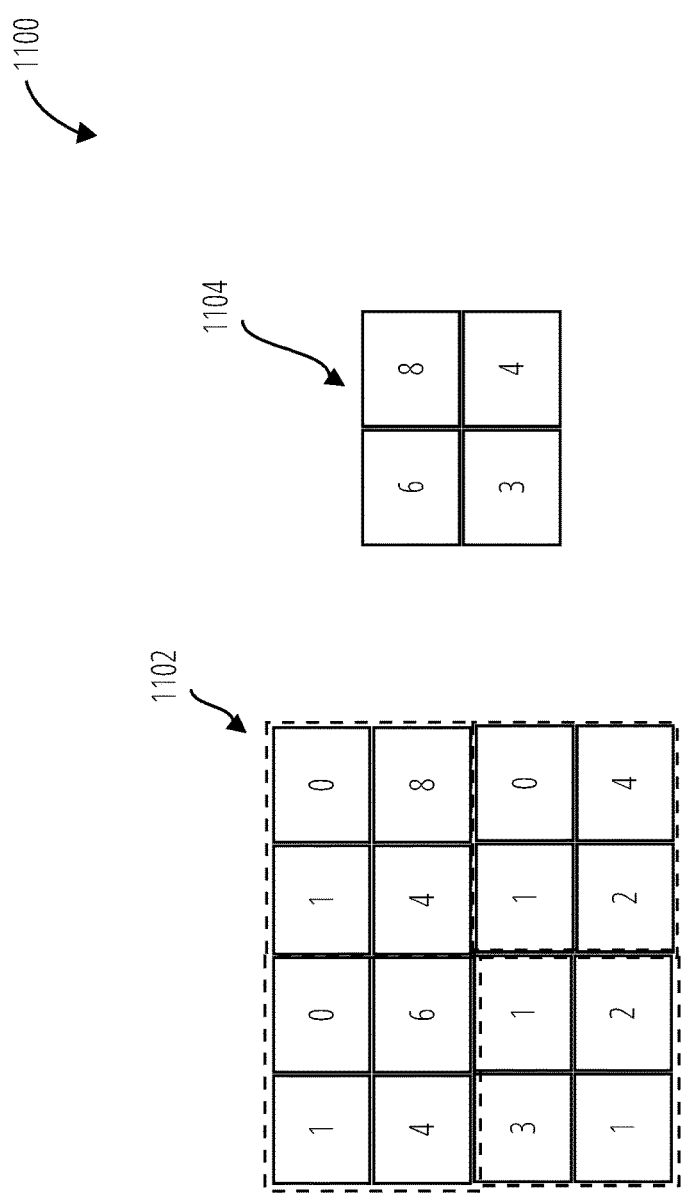
FIG. 11 illustrates a pooling layer function 1100 in accordance with one embodiment.

FIG. 11 illustrates a pooling layer function 1100 with a 2×2 receptive field and a stride of two. The pooling layer function 1100 is an example of the maxpool pooling technique. The outputs of all the neurons in a particular receptive field of the input layer 1102 are replaced by the maximum valued one of those outputs in the pooling layer 1104. Other options for pooling layers are average pooling and L2-norm pooling. The reason to use a pooling layer is that once a specific feature is recognized in the original input volume (there will be a high activation value), its exact location is not as important as its relative location to the other features. Pooling layers can drastically reduce the spatial dimension of the input layer 1102 from that point forward in the neural network (the length and the width change but not the depth). This serves two main purposes. The first is that the amount of parameters or weights is greatly reduced thus lessening the computation cost. The second is that it will control overfitting. Overfitting refers to when a model is so tuned to the training examples that it is not able to generalize well when applied to live data sets.

Figure 12:
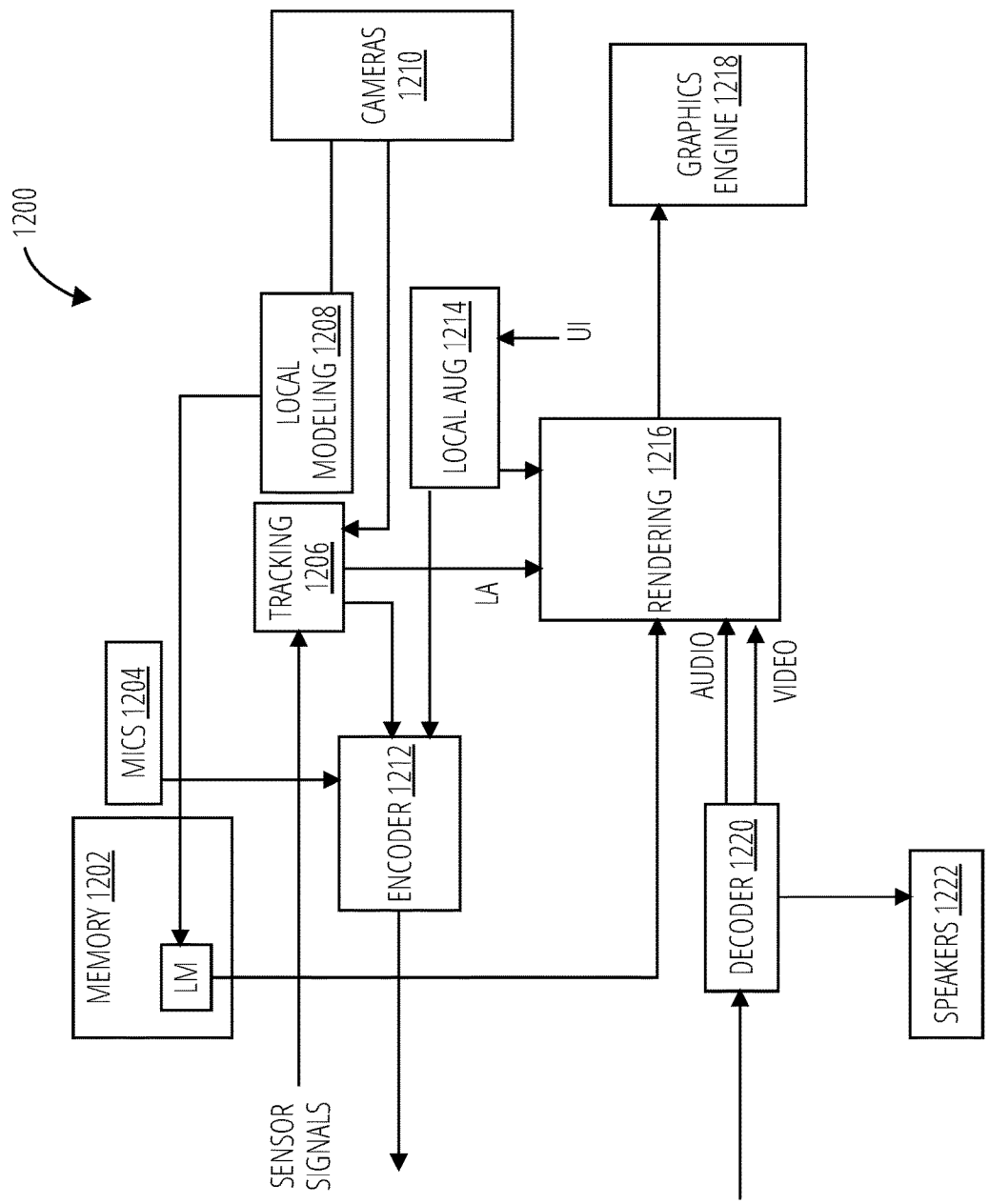
FIG. 12 illustrates an AR device logic 1200 in accordance with one embodiment.

FIG. 12 illustrates a functional block diagram of an embodiment of AR device logic 1200. The AR device logic 1200 comprises the following functional modules: a rendering engine 1216, local augmentation logic 1214, local modeling logic 1208, device tracking logic 1206, an encoder 1212, and a decoder 1220. Each of these functional modules may be implemented in software, dedicated hardware, firmware, or a combination of these logic types.

The rendering engine 1216 controls the graphics engine 1218 to generate a stereoscopic image visible to the wearer, i.e. to generate slightly different images that are projected onto different eyes by the optical components of a headset substantially simultaneously, so as to create the impression of 3D structure.

The stereoscopic image is formed by rendering engine 1216 rendering at least one virtual display element ("augmentation"), which is perceived as a 3D element, i.e. having perceived 3D structure, at a real-world location in 3D space by the user.

An augmentation is defined by an augmentation object stored in the memory 1202. The augmentation object comprises: location data defining a desired location in 3D space for the virtual element (e.g. as (x,y,z) Cartesian coordinates); structural data defining 3D surface structure of the virtual element, i.e. a 3D model of the virtual element; and image data defining 2D surface texture of the virtual element to be applied to the surfaces defined by the 3D model. The augmentation object may comprise additional information, such as a desired orientation of the augmentation.

The perceived 3D effects are achieved though suitable rendering of the augmentation object. To give the impression of the augmentation having 3D structure, a stereoscopic image is generated based on the 2D surface and 3D augmentation model data in the data object, with the augmentation being rendered to appear at the desired location in the stereoscopic image.

A 3D model of a physical object is used to give the impression of the real-world having expected tangible effects on the augmentation, in the way that it would a real-world object. The 3D model represents structure present in the real world, and the information it provides about this structure allows an augmentation to be displayed as though it were a real-world 3D object, thereby providing an immersive augmented reality experience. The 3D model is in the form of 3D mesh.

For example, based on the model of the real-world, an impression can be given of the augmentation being obscured by a real-world object that is in front of its perceived location from the perspective of the user; dynamically interacting with a real-world object, e.g. by moving around the object; statically interacting with a real-world object, say by sitting on top of it etc.

Whether or not real-world structure should affect an augmentation can be determined based on suitable rendering criteria. For example, by creating a 3D model of the perceived AR world, which includes the real-world surface structure and any augmentations, and projecting it onto a plane along the AR user's line of sight as determined using pose tracking (see below), a suitable criteria for determining whether a real-world object should be perceived as partially obscuring an augmentation is whether the projection of the real-world object in the plane overlaps with the projection of the augmentation, which could be further refined to account for transparent or opaque real world structures. Generally, the criteria can depend on the location and/or orientation of the augmented reality device and/or the real-world structure in question.

An augmentation can also be mapped to the mesh, in the sense that its desired location and/or orientation is defined relative to a certain structure(s) in the mesh. Should that structure move and/or rotate causing a corresponding change in the mesh, when rendered properly this will cause corresponding change in the location and/or orientation of the augmentation. For example, the desired location of an augmentation may be on, and defined relative to, a table top structure; should the table be moved, the augmentation moves with it. Object recognition can be used to this end, for example to recognize a known shape of table and thereby detect when the table has moved using its recognizable structure. Such object recognition techniques are known in the art.

An augmentation that is mapped to the mash in this manner or is otherwise associated with a particular piece of surface structure embodied in a 3D model, is referred to an "annotation" to that piece of surface structure. In order to annotate a piece of real-world surface structure, it is necessary to have that surface structure represented by the 3D model in question—without this, the real-world structure cannot be annotated.

The local modeling logic 1208 generates a local 3D model "LM" of the environment in the memory 1202, using the AR device's own sensor(s) e.g. cameras 1210 and/or any dedicated depth sensors etc. The local modeling logic 1208 and sensor(s) constitute sensing apparatus.

The device tracking logic 1206 tracks the location and orientation of the AR device, e.g. a headset, using local sensor readings captured from the AR device. The sensor readings can be captured in a number of ways, for example using the cameras 1210 and/or other sensor(s) such as accelerometers. The device tracking logic 1206 determines the current location and orientation of the AR device and provides this information to the rendering engine 1216, for example by outputting a current "pose vector" of the AR device. The pose vector is a six dimensional vector, for example (x, y, z, P, R, Y) where (x,y,z) are the device's Cartesian coordinates with respect to a suitable origin, and (P, R, Y) are the device's pitch, roll and yaw with respect to suitable reference axes.

The rendering engine 1216 adapts the local model based on the tracking, to account for the movement of the device i.e. to maintain the perception of the as 3D elements occupying the real-world, for example to ensure that static augmentations appear to remain static (which will in fact be achieved by scaling or rotating them as, from the AR user's perspective, the environment is moving relative to them).

The encoder 1212 receives image data from the cameras 1210 and audio data from the microphones 1204 and possibly other types of data (e.g., annotation or text generated by the user of the AR device using the local augmentation logic 1214) and transmits that information to other devices, for example the devices of collaborators in the AR environment. The decoder 1220 receives an incoming data stream from other devices, and extracts audio, video, and possibly other types of data (e.g., annotations, text) therefrom.

Figure 13:
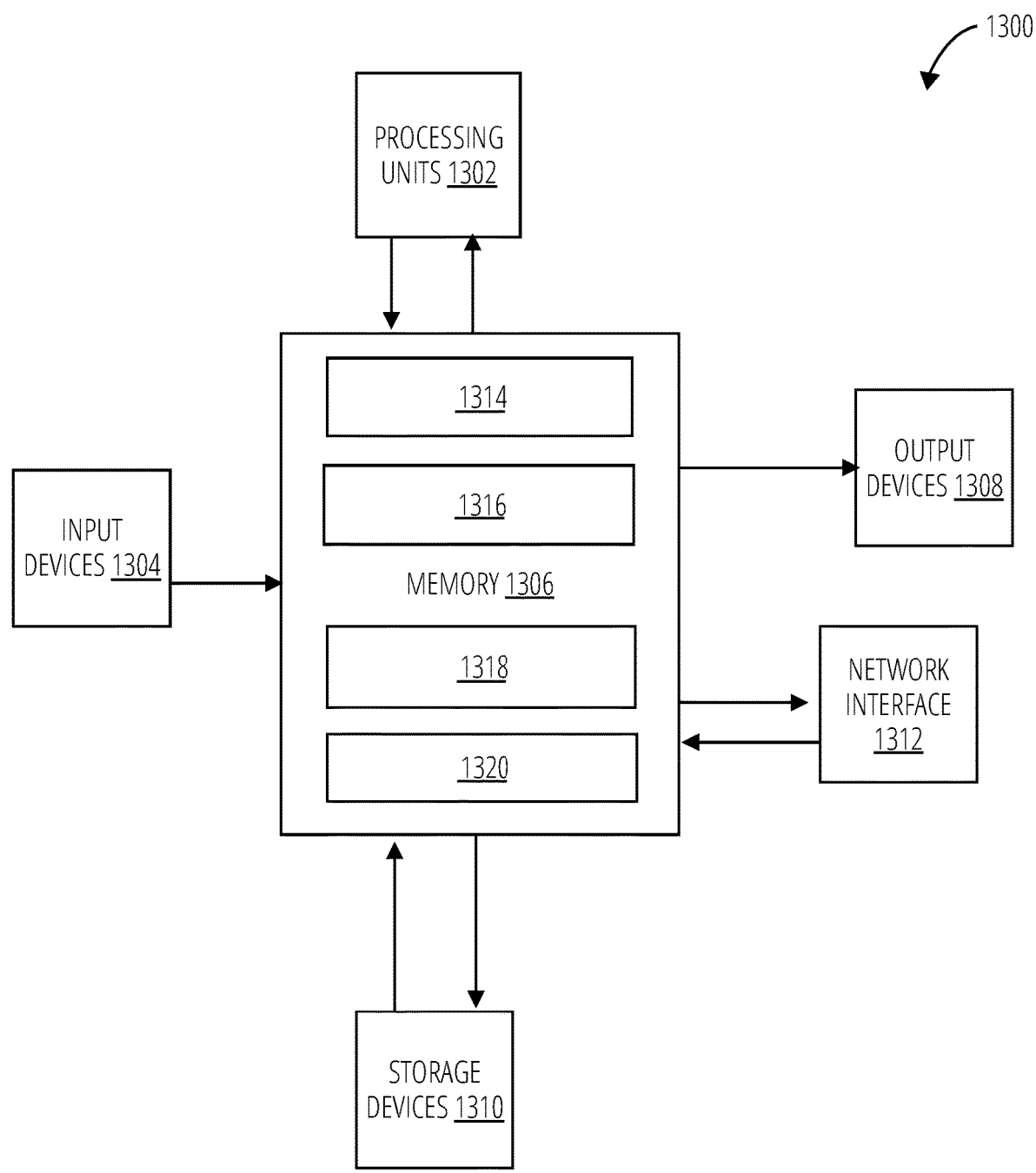
FIG. 13 illustrates an AR device 1300 that may implement aspects of the machine processes described herein.

FIG. 13 illustrates more aspects of an AR device 1300 according to one embodiment. The AR device 1300 comprises processing units 1302, input devices 1304, memory 1306, output devices 1308, storage devices 1310, a network interface 1312, and various logic to carry out the processes disclosed herein.

The input devices 1304 comprise transducers that convert physical phenomenon into machine internal signals, typically electrical, optical or magnetic signals. Signals may also be wireless in the form of electromagnetic radiation in the radio frequency (RF) range but also potentially in the infrared or optical range. Examples of input devices 1304 are keyboards which respond to touch or physical pressure from an object or proximity of an object to a surface, mice which respond to motion through space or across a plane, microphones which convert vibrations in the medium (typically air) into device signals, scanners which convert optical patterns on two or three dimensional objects into device signals. The signals from the input devices 1304 are provided via various machine signal conductors (e.g., busses or network interfaces) and circuits to memory 1306.

The memory 1306 provides for storage (via configuration of matter or states of matter) of signals received from the input devices 1304, instructions and information for controlling operation of the processing units 1302, and signals from storage devices 1310. The memory 1306 may in fact comprise multiple memory devices of different types, for example random access memory devices and non-volatile (e.g., FLASH memory) devices. in Information stored in the memory 1306 is typically directly accessible to the processing units 1302 of the device. Signals input to the AR device 1300 cause the reconfiguration of the internal material/energy state of the memory 1306, creating logic that in essence forms a new machine configuration, influencing the behavior of the AR device 1300 by affecting the behavior of the processing units 1302 with control signals (instructions) and data provided in conjunction with the control signals. In the AR device 1300, the memory 1306 comprises logic 1314, logic 1316, logic 1318, and logic 1320.

The storage devices 1310 may provide a slower but higher capacity machine memory capability. Examples of storage devices 1310 are hard disks, optical disks, large capacity flash memories or other non-volatile memory technologies, and magnetic memories.

The processing units 1302 may cause the configuration of the memory 1306 to be altered by signals in the storage devices 1310. In other words, the processing units 1302 may cause data and instructions to be read from storage devices 1310 in the memory 1306 from which may then influence the operations of processing units 1302 as instructions and data signals, and from which it may also be provided to the output devices 1308. The processing units 1302 may alter the content of the memory 1306 by signaling to a machine interface of memory 1306 to alter the internal configuration, and then converted signals to the storage devices 1310 to alter its material internal configuration. In other words, data and instructions may be backed up from memory 1306, which is often volatile, to storage devices 1310, which are often non-volatile.

Output devices 1308 are transducers which convert signals received from the memory 1306 into physical phenomenon such as vibrations in the air, or patterns of light on a machine display, or vibrations (i.e., haptic devices) or patterns of ink or other materials (i.e., printers and 3-D printers).

The network interface 1312 receives signals from the memory 1306 or processing units 1302 and converts them into electrical, optical, or wireless signals to other machines, typically via a machine network. The network interface 1312 also receives signals from the machine network and converts them into electrical, optical, or wireless signals to the memory 1306 or processing units 1302.

Figure 14:
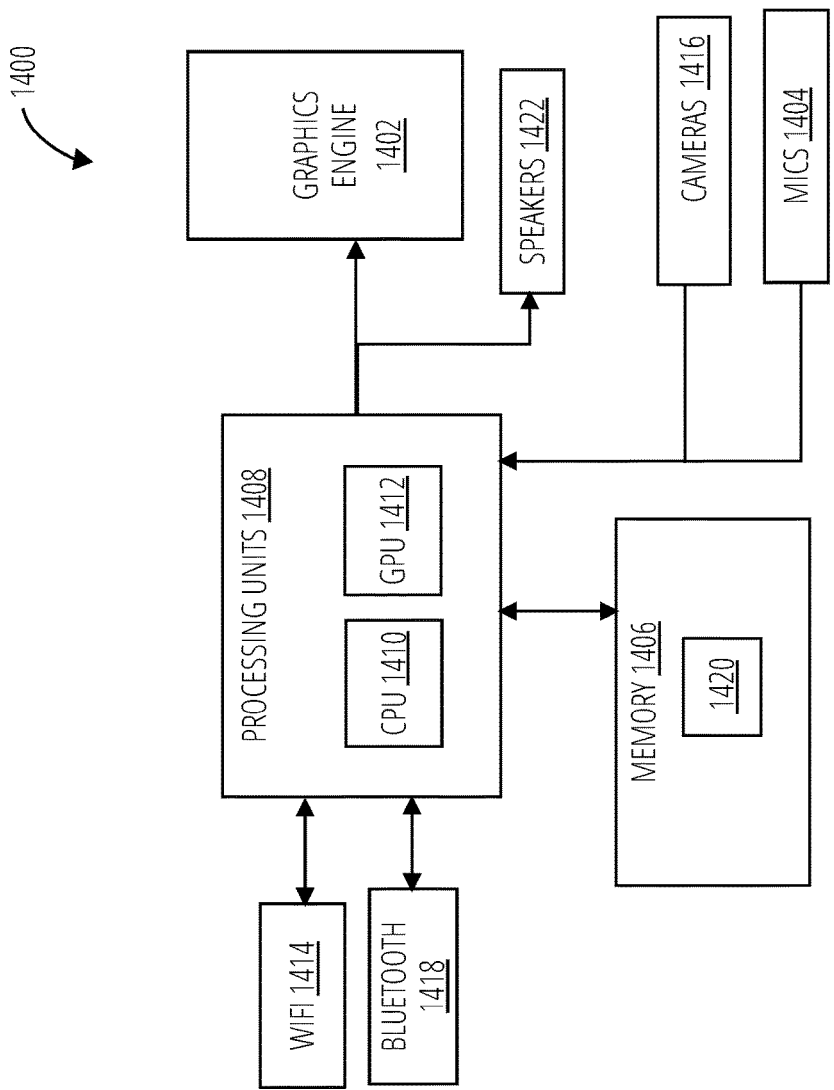
FIG. 14 illustrates an augmented reality device logic 1400 in accordance with one embodiment.

FIG. 14 illustrates components of an exemplary augmented reality device logic 1400. The augmented reality device logic 1400 comprises a graphics engine 1402, cameras 1416, processing units 1408, including one or more CPU 1410 and/or GPU 1412, a WiFi 1414 wireless interface, a Bluetooth 1418 wireless interface, speakers 1422, microphones 1404, and one or more memory 1406.

The processing units 1408 may in some cases comprise programmable devices such as bespoke processing units optimized for a particular function, such as AR related functions. The augmented reality device logic 1400 may comprise other components that are not shown, such as dedicated depth sensors, additional interfaces etc.

Some or all of the components in FIG. 14 may be housed in an AR headset. In some embodiments, some of these components may be housed in a separate housing connected or in wireless communication with the components of the AR headset. For example, a separate housing for some components may be designed to be worn or a belt or to fit in the wearer's pocket, or one or more of the components may be housed in a separate computer device (smartphone, tablet, laptop or desktop computer etc.) which communicates wirelessly with the display and camera apparatus in the AR headset, whereby the headset and separate device constitute the full augmented reality device logic 1400.

The memory 1202 comprises logic 1420 to be applied to the processing units 1408 to execute. In some cases, different parts of the logic 1420 may be executed by different components of the processing units 1408. The logic 1420 typically comprises code of an operating system, as well as code of one or more applications configured to run on the operating system to carry out aspects of the processes disclosed herein.

Implementations and Terminology

Terms used herein should be accorded their ordinary meaning in the relevant arts, or the meaning indicated by their use in context, but if an express definition is provided, that meaning controls.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non-transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Software" in this context refers to logic implemented as processor-executable instructions in a machine memory (e.g. read/write volatile or nonvolatile memory or media).

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

What is claimed is:

1. A method of applying an image effect based on recognized objects, the method comprising:
   capturing an imaging area comprising at least one object as an image stream through operation of an image sensor;
   recognizing the at least one object in the image stream through operation of an object detection engine;
   communicating at least one correlated image effect control to an image processing engine, in response to the at least one object comprising an optical label;
   communicating at least one matched image effect control to the image processing engine, in response to receiving a labeled image stream at an image effect matching algorithm from the object detection engine; and
   generating a transformed image stream, displayable through a display device, by applying at least one image effect control to the image stream, wherein the transformed image stream comprises a post processed image stream wherein the at least one image effect control is at least one post processing effect applied to the image stream through operation of the image processing engine.

2. The method of claim 1, wherein the object detection engine is a trained artificial neural network for recognizing the at least one object in the image stream.

3. The method of claim 1 further comprising:
   receiving the image stream from the image sensor at the object detection engine;
   detecting the optical label in the image stream and extracting an embedded identifier from the optical label through operation of the object detection engine; and
   identifying the at least one image effect control in an image effects repository through comparison of the embedded identifier to optical label identifiers in a correlation table through operation of an optical label correlator.

4. The method of claim 1 further comprising:
   receiving the image stream from the image sensor at the object detection engine;
   detecting at least one recognized object in the image stream through operation of the object detection engine;
   generating the labeled image stream by:
   identifying each recognized object within the image stream with an object classification label; and identifying object environment and object arrangement within the image stream as a scene with a scene classification label; and operating the image effect matching algorithm to match at least one of the optical label, the scene classification label, the object classification label, and combinations thereof with at least one corresponding image effect control from an image effects repository.

5. The method of claim 4 wherein the image effect matching algorithm utilizes a trained artificial neural network to match at least one of the optical label, the scene classification label, object classification label, and combinations thereof with the at least one corresponding image effect control from the image effects repository.

6. The method of claim 1, wherein the at least one image effect control comprises an object linked augmentation effect control, an overlay control, and combinations thereof; and wherein the at least one post processing effect is at least one of a filter effect control, a distortion effect control, and combinations thereof.

7. A non-transitory computer-readable storage medium, the computer-readable storage medium including instructions that when executed by a computer, cause the computer to:

capture an imaging area comprising at least one object as an image stream through operation of an image sensor;

recognize the at least one object in the image stream through operation of an object detection engine;

communicate at least one correlated image effect control to an image processing engine, in response to the at least one object comprising an optical label;

communicate at least one matched image effect control to the image processing engine, in response to receiving a labeled image stream at an image effect matching algorithm from the object detection engine; and generate a transformed image stream, displayable through a display device, by applying at least one image effect control to the image stream, wherein the transformed image stream comprises a post processed image stream wherein the at least one image effect control is a post processing effect applied to the image stream through operation of the image processing engine.

8. The computer-readable storage medium of claim 7, wherein the object detection engine is a trained artificial neural network for recognizing the at least one object in the image stream.

9. The computer-readable storage medium of claim 7 wherein the instructions further configure the computer to:

receive the image stream from the image sensor at the object detection engine;

detect the optical label in the image stream and extracting an embedded identifier from the optical label through operation of the object detection engine; and identify the at least one image effect control in an image effects repository through comparison of the embedded identifier to optical label identifiers in a correlation table through operation of an optical label correlator.

10. The computer-readable storage medium of claim 7 wherein the instructions further configure the computer to:

receive the image stream from the image sensor at the object detection engine;

detect at least one recognized object in the image stream through operation of the object detection engine;

generate the labeled image stream by:

identify each recognized object within the image stream with an object classification label; and identify object environment and object arrangement within the image stream as a scene with a scene classification label; and operate the image effect matching algorithm to match at least one of the optical label, the scene classification label, object classification label, and combinations thereof with at least one corresponding image effect control from an image effects repository.

11. The computer-readable storage medium of claim 10 wherein the image effect matching algorithm utilizes a trained artificial neural network to match at least one of the optical label, the scene classification label, object classification label, and combinations thereof with the at least one corresponding image effect control from the image effects repository.

12. The computer-readable storage medium of claim 7, wherein the at least one post processing effect is at least one of a filter effect control, a distortion effect control, and combinations thereof.

13. A computing apparatus, the computing apparatus comprising:

a processor; and a memory storing instructions that, when executed by the processor, configure the apparatus to:

capture an imaging area comprising at least one object as an image stream through operation of an image sensor;

recognize the at least one object in the image stream through operation of an object detection engine;

communicate at least one correlated image effect control to an image processing engine, in response to the at least one object comprising an optical label;

communicate at least one matched image effect control to the image processing engine, in response to receiving a labeled image stream at an image effect matching algorithm from the object detection engine; and generate a transformed image stream, displayable through a display device, by applying at least one image effect control to the image stream, wherein the transformed image stream comprises a post processed image stream wherein the at least one image effect control is a post processing effect applied to the image stream through operation of the image processing engine.

14. The computing apparatus of claim 13, wherein the object detection engine is a trained artificial neural network for recognizing the at least one object in the image stream.

15. The computing apparatus of claim 13 wherein the instructions further configure the apparatus to:

receive the image stream from the image sensor at the object detection engine;

detect the optical label in the image stream and extracting an embedded identifier from the optical label through operation of the object detection engine; and identify the at least one image effect control in an image effects repository through comparison of the embedded identifier to optical label identifiers in a correlation table through operation of an optical label correlator.

16. The computing apparatus of claim 13 wherein the instructions further configure the apparatus to:

receive the image stream from the image sensor at the object detection engine;

detect at least one recognized object in the image stream through operation of the object detection engine;

generate the labeled image stream by:
    identify each recognized object within the image stream with an object classification label; and
    identify object environment and object arrangement within the image stream as a scene with a scene classification label; and
operate the image effect matching algorithm to match at least one of the optical label, the scene classification label, object classification label, and combinations thereof with at least one corresponding image effect control from an image effects repository.

17. The computing apparatus of claim 16 wherein the image effect matching algorithm utilizes a trained artificial neural network to match at least one of the optical label, the scene classification label, object classification label, and combinations thereof with the at least one corresponding image effect control from the image effects repository.

18. The computing apparatus of claim 13, wherein the at least one image effect control is at least one of a filter effect control, an object linked augmentation effect control, a distortion effect control, an overlay control, and combinations thereof.

19. The method of claim 1 further comprising:
receiving the image stream from the image sensor at the object detection engine;
detecting the at least one recognized object in the image stream through operation of the object detection engine;
generating the labeled image stream by:
    identifying each recognized object within the image stream with the object classification label;
    identifying object environment and object arrangement within the image stream as a scene with a scene classification label;
operating the image effect matching algorithm to match at least one of the optical label, the scene classification label, the object classification label, and combinations thereof with the at least one corresponding image effect control from an image effects repository;
wherein the image effect matching algorithm utilizes a trained artificial neural network to match at least one of the optical label, the scene classification label, the object classification label, and combinations thereof with the at least one corresponding image effect control from the image effects repository;
wherein the at least one image effect control comprises an object linked augmentation effect control, an overlay control, and combinations thereof, and
wherein the at least one post processing effect is at least one of a filter effect control, a distortion effect control, and combinations thereof.

20. The method of claim 19 further comprising:
the filter effect control is an image post processing effect that modifies channel values of the image stream, wherein the filter effect control is at least one of blur filters, brightness filters, contrast filters, grayscale filters, hue filters, color channel filters, saturation filters, sepia filters, spatial lowpass filters, spatial highpass filters, fourier representation filters, fourier lowpass filters, fourier highpass, and combinations thereof, and
the distortion effect control is an enhancement or modification to the at least one identified object in the image stream, wherein the distortion effect control is at least one of scale effects, warp effects, and combinations thereof to the identified object.

\* \* \* \* \*